UNITED STATES PATENT OFFICE.

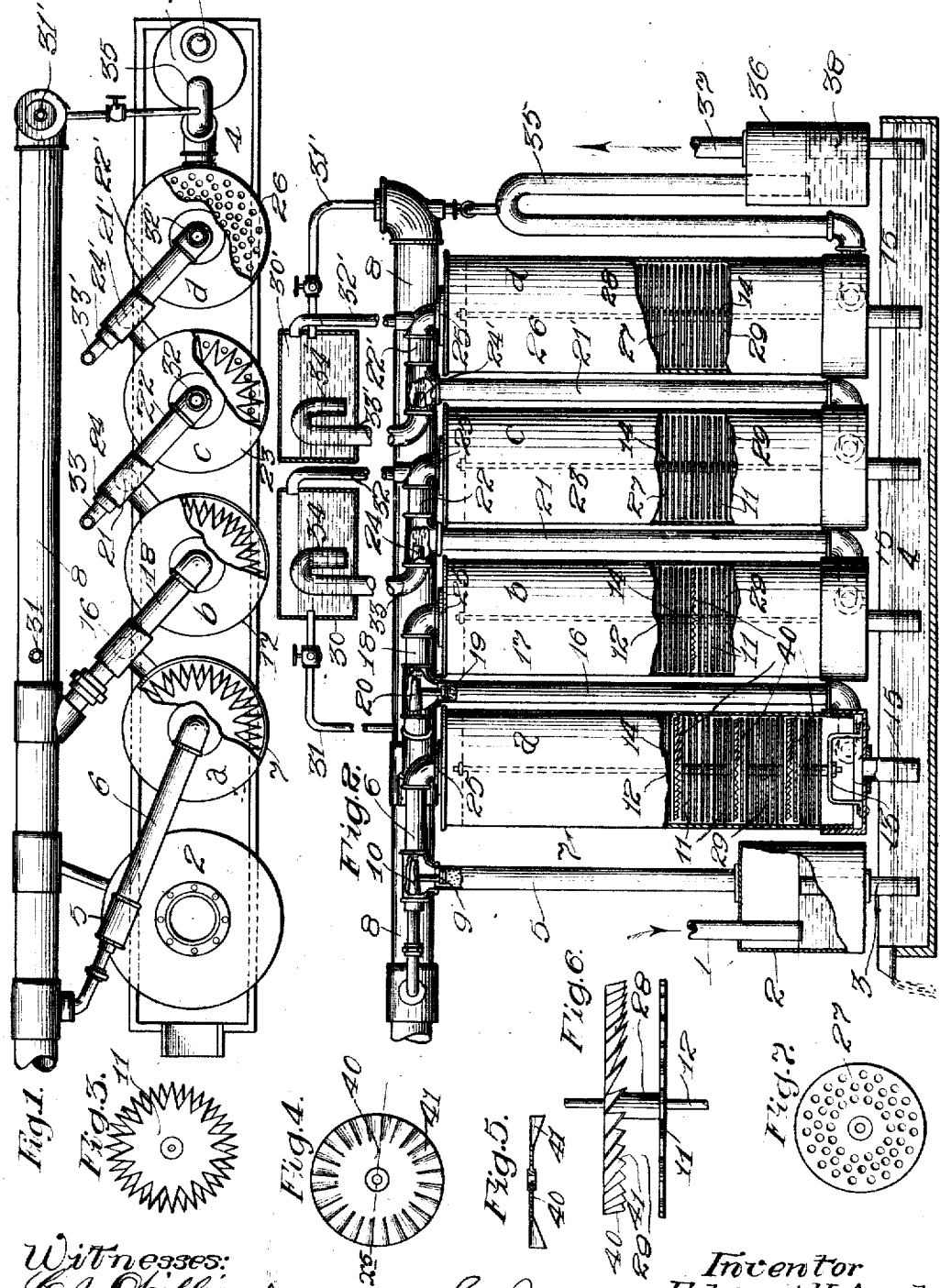

EDWARD H. AMET, OF PHOENIX, ARIZONA TERRITORY, ASSIGNOR TO INTERNATIONAL AMET COMPANY, OF PHOENIX, ARIZONA TERRITORY, A CORPORATION OF ARIZONA TERRITORY.

GAS COOLER AND CLEANER.

No. 931,018.    Specification of Letters Patent.    Patented Aug. 10, 1909.

Application filed September 3, 1907. Serial No. 391,235.

*To all whom it may concern:*

Be it known that I, EDWARD H. AMET, a citizen of the United States, residing at Phoenix, in the county of Maricopa and Territory of Arizona, have invented a new and useful Gas Cooler and Cleaner, of which the following is a specification.

This invention relates to gas coolers and cleaners adapted to cool and clean the gas produced from hydrocarbon oils. It is also adapted for cleaning other gases.

It is one of the objects of this invention to produce a compact, simple, cheap, economical, and efficient means for cleaning and cooling gases, which will automatically cleanse itself and connections from the impurities removed from such gases and which will operate continuously with a minimum amount of water and attention, and in which provision is made for overcoming any back pressure that may be offered to the outgoing gases.

Other objects and advantages may appear in the matters following.

I regard this invention as pioneer in a number of features. For instance, the details of the apparatus by which the gas is subjected to the action of the cleansing liquid, as water, while flowing downward, so that the cleansing liquid and the gas move in the same general downward direction, and the motion of the liquid accelerates the motion of the gas. The tendency of the pure gaseous substance to gravitate, being less than that of the solid or liquid particles in the gas, the force of gravity assists in the separation of the solids and liquids from the gas, while the general downward direction of travel is unchanged, and such separation occurs in a gentle and non-disruptive manner so as to avoid breaking up or disrupting any accumulation of solids which may form, the tendency being always toward concentrating and separating the solids and liquids from the gas.

I employ the principle of successive accelerations and retardations of the gas while in intimate combination with the cleansing liquid. The gas is caused to travel at a comparatively very high speed between the subsidence contrivances so that when the gas enters any such contrivance it comes into a comparatively quiescent condition, while the momentum of the solids tends to project the same onward through the gas in the direction the water tends to flow. At the same time provision is made whereby the course of the gas is frequently changed from a vertical to an oblique direction so that the force of gravity in the liquid and the solids will carry the same downward out of the course of the gas with which it had been combined.

Obstacles are placed in the course of the gas and water in a staggered arrangement so that the solids may collect on said obstacles, and provision is made for washing off the solids thus collected and carrying them out through traps at the bottom of the apparatus. The means for washing off the impurities may be of various kinds, and in the accompanying drawings I shall illustrate the invention as applied in an apparatus in which a constant washing occurs in a part of said apparatus, and an intermittent washing is accomplished in another part.

The invention may be applied in various forms, and I do not limit myself to any particular form of construction.

I have discovered that deposits of by-products from the gas as it comes from the generator or from the generator-seal, will form more rapidly on a dry plate or surface than on a wet plate or surface. For instance, if a dry cloth be placed over the mouth of a pipe leading from the generator-seal, the same will rapidly clog with soot or lamp-black, while if the cloth be kept wet, practically no accumulations of soot or lamp-black will form. I have made provision for taking advantage of this fact in my present cooler and cleaner, and have constructed the same in such manner that some of the surfaces arranged in the path of the gas will be comparatively dry a considerable portion of the time, so that the by-products may readily adhere thereto, provision being made for intermittently removing the by-products.

The tendency of the by-products to separate from the gas under the action of water is greater at the outset of the process of cleaning the gas than later on, and I have therefore made provision in the first portion of the washer for an uninterrupted flow of cleansing medium to deposit and wash away the by-products, and in the succeeding part of the washer I have made provision for practically dry plates which are intermittently washed with a cleansing medium to carry away the by-products which will deposit thereon in the intervals between the washings.

The accompanying drawings illustrate the invention.

Figure 1 is a plan of a gas cooling and cleaning apparatus embodying this invention, parts being broken away to expose interior construction. Fig. 2 is a side elevation of the same, parts being broken away to expose interior construction. Fig. 3 is a plan of the star form of cleaning disks. Fig. 4 is a plan of the propeller form of cleaning disk. Fig. 5 is a section of Fig. 4 on line $x^5$. Fig. 6 is an enlarged elevation of two of the cleaning disks comprising the star and the propeller forms. Fig. 7 is a plan view of another form of cleaning disk.

1 is the usual pipe leading from the generator into the usual generator-seal 2 from which the overflow of liquid passes through the usual pipe 3 into a seal and discharge trough 4.

5 is a gas-pipe riser from the cooler and seal 2 which may lead upward a determined distance, say eight feet more or less, to a horizontal pipe 6 which is connected with and discharges into a washer which may consist of one or more upright cylinders containing internal means for accumulating and discharging the solids and liquids carried by the gas.

7 designates an upright cylinder or shell into the top of which pipe 6 discharges.

8 designates a water main, and 9, 10, nozzles connected therewith, one of said nozzles being arranged at the top of riser 5 and being in the form of a sprinkler to throw a spray of water onto the inner walls of the riser 5 to keep the same wet and thereby prevent any accumulations thereon of impurities from the gas. The nozzle 10 is arranged to discharge a jet of water along the horizontal pipe 6 toward the mouth thereof which is connected with the cylinder 7. The purpose of this jet is two-fold; viz.,—first, to accelerate the movement of the gas in the gas-pipe 6, and second, to supply water to the top of the washer.

11 designates a stack of disks of sheet metal or other suitable material inside the cylinder 7 to form a series of obstacles or impediments in the path of the gas, the same being arranged one above the other with open spaces between.

12 designates a rod supported by a pedestal 13. Said rod passes through the washer-disks 11 and through the collars 14 between the same, which hold the disks spaced apart.

15 is a trapped discharge leading from the bottom of cylinder 7 into the discharge trough 4.

In the drawings shown, the washer is composed of four units, $a$, $b$, $c$, $d$, the first two of the units $a$, $b$, being of one construction, and the succeeding two $c$, $d$, of another construction.

16 is a riser leading from the unit indicated at $a$ upward to above the plane of the second unit $b$ and connected with said second unit by a horizontal pipe limb 18.

19 and 20 designate two nozzles at the top of the riser 16, the nozzle 19 being in the form of a sprinkler to spray the walls of the pipe 16 in the same manner as the sprinkler 9 sprays the walls of the pipe 5, and the nozzle 20 being adapted to direct a jet of water along the horizontal pipe limb 18 in the same manner in which the nozzle 10 directs the water along the horizontal pipe 6.

The interior construction of the unit $b$ corresponds to that of the unit $a$, and the like interior parts of these two units are designated by like characters.

21 is a riser connected with the lowest part of the cylinder 17 in the same manner as the riser 16 is connected with the cylinder 7, and connected by pipe 22 with the cylinder 23 of the unit $c$.

24 designates a nozzle to direct a jet of water along the horizontal pipe 22 which connects the top of the riser 24 with the top of the cylinder 23. The several connections 6, 18 and 22 open downwardly into their respective cylinders at the axis thereof as indicated at 25. The same is connected with cylinder 26 through riser 21' and connection 22'; and a nozzle 24' discharges across the top of the riser 21' and along connection 22', to spray and to accelerate the flow of gas in 22' and to flush the pipe 22' and the unit $d$.

27 designates disks arranged in a stack inside of the cylinders 23 and 26 in a manner corresponding to the disks 11 in the cylinders 7 and 17, respectively, and each of these cylinders discharges the by products and the cleansing liquid into the trough 4 through the pipes 15 which appertain thereto.

The disks 27 of the units $c$ and $d$ are shown of a different form from the disks 11 of the units $a$ and $b$, the disks 11 being in the form of a star, the points of each of the superposed stars being staggered relative to the points of the adjacent stars, so as to form a more or less tortuous path inside the cylinder through which the gas must flow, and the disks 27 in the cylinders 23 and 26 are shown as perforated with a plurality of holes, the perforations of one disk being above the unperforated portion of the disk below, and so on. In each of the units the disks are spaced apart by any suitable means, as by the collars 14, and 28, thus forming between said disks expansion chambers 29 into which the gas may become distributed after passing through the apertures of one disk and before passing through the apertures of the succeeding disk.

The units $c$ and $d$ are designed to be cleansed intermittently by flushing apparatus, the purpose being to allow the stars 11 and disks 27 therein to be dry at the outset and at intervals thereafter during the operation of the apparatus so that after the gas has passed through the units a and b and has deposited therein the more readily deposited by-products, it will come into contact with practically dry surfaces in the units c and d, whereupon the by-products remaining in the gas rapidly deposit upon the disks or plates 27. After deposits of by-products are once formed on said plates or disks, further deposits of the by-products very readily form thereon, the deposits already made having an affinity for the by-products carried by the gas. Each of the units c and d is provided with a flushing apparatus, the description of one of which will apply to both. 30 is a flush tank; 31 a valved water-supply-pipe; 32 an equalizing pipe between the gas pipe 22 and the top of the flush-tank which is closed to the external air except through the apparatus.

33 is a flush pipe preferably of a smaller diameter than the gas-pipe 22, the lower end of the same constituting the nozzle 24 hereinbefore referred to, to direct a stream of water along the pipe 22 in the direction in which the gas will flow from the pipe 21. Such stream of water is directed across the top of the pipe 21, so that some portion of water from the flushing stream as it flows across the top of pipe 21 will break upon the upper margin of the pipe 21 and flow down such pipe for the purpose of wetting the walls thereof.

The flush-tank 30 is arranged at a considerable height, say five feet, more or less, above the top of the unit into which it discharges; the purpose being to provide a strong flushing stream so that when the flushing discharge takes place the accumulations of by-products on the plates or diaphragms of the washer-unit will be washed off and down into the seal and discharge trough 4.

The flush-pipe 33 may be provided at its upper end with any desirable form of intermittent siphoning device, as indicated in a conventional way at 34, so that the tank 30 will fill to a determined depth, and thereupon will suddenly discharge through the flush-pipe 33 to perform the work above described. When the liquid in the tank lowers sufficiently to admit air to the mouth of the siphon the flow will cease, thus allowing the tank to again fill until siphoning flow is again established, whereupon the operation just described is repeated. Any desirable form of flushing device may be employed; for example, any of the well-known sewer man-hole flushing devices in common use, detail illustration of which is not here necessary.

The different parts of the flushing apparatus shown for the unit d are marked with characters corresponding to those with which like parts of the apparatus for the unit c are marked, being distinguished therefrom by an index.

35 designates the gas outlet through the seal 36 and pipe 37 to the holder not shown, the seal 36 being provided with an overflow pipe 38 leading to the seal and discharge trough 4.

It is to be understood that a greater or less number of washer units may be provided within the judgment of the constructor, and that all of the units c and d may be omitted; connecting the outlet with the pipe 21, or that the pipe 5 may be connected with the pipe 21 omitting the units a, b, and that the character of disks shown in units a and b may be employed in the units c and d, and vice versa; all of these changes being within the judgment of the constructor to meet the various requirements which he may find in any particular case, and I may change the construction of the apparatus in many various ways without departing from the spirit of the invention which I have hereinbefore set forth and which is more particularly pointed out in the appended claims.

I deem the star form of disks shown in Fig. 3 as preferable to any other form for the purpose of affording a multitude of elongated edges around which the gas may flow with considerable friction, so that the by-products will form on the edges and will break over and drop down from star-point to star-point while the gas is divided into a multiplicity of streams and is forced to take a tortuous course between the points of one star and those of the succeeding star, spreading out in all directions in the interposed chambers which form expansions of the gas way between the interstices of the individual stars, and which interstices form contractions of said way, so that the gas is alternately expanded and contracted as it passes through the interstices and the intermediate chambers. At intervals in the stacks of washer disks or stars 11, other disks, as 40, are provided, having blades 41 set aslant to direct the gas around in the chamber below, thus to give a circular motion to the gas as it passes through the washer.

What I claim is:—

1. A gas cleaner comprising means for conducting the gas along and successively accelerating and retarding it in a course, and means for applying thereto and conducting therefrom a cleansing medium, said means for applying the cleansing medium being, in part, intermittent.

2. A gas cleaner comprising means for conducting the gas along and successively accelerating and retarding it in a course, and means for applying thereto and conducting therefrom a cleansing medium, said means for applying the cleansing medium being, in part, intermittent, and in part non-intermittent.

3. A gas cleaner comprising means for conducting the gas along and successively accelerating and retarding it in a course, and means for applying thereto and conducting therefrom a cleansing medium, said means for applying the cleansing medium being, in part, intermittent, and in part non-intermittent, the intermittent succeeding the non-intermittent part.

4. A gas cleaner provided with a way having alternate expansions and contractions, and an automatic intermittent flushing device to direct one or more sprays of water along the way in the direction of the flow of gas, the flow of the gas being downward with the flow of the water.

5. A gas cleaner provided with a way having alternate expansions and contractions, and an automatic intermittent flushing device for accelerating the flow of gas along one or more of the contractions, in a downward direction.

6. A gas cleaner provided with a way having alternate expansions and contractions, and an automatic intermittent flushing device for injecting a cleansing medium along one or more of the contractions and thereby accelerating the flow of gas along the same in a downward direction.

7. A gas cleaner comprising a washer composed of units provided with means for removing by-products from the gas, pipes connecting such units, the pipe from one unit leading from the lower part of such unit to the upper part of the succeeding unit, and an automatic intermittent flushing device to cause a flow of cleansing liquid downward through one or more of such units, and means to cause the gas to flow downwardly with the cleansing liquid.

8. A gas cleaner comprising a washer composed of units provided with means for removing by-products from the gas, pipes connecting such units, the pipe from one unit leading from the lower part of such unit to the upper part of the succeeding unit, and provided at an upper portion with a horizontal limb, means to cause a flow of liquid along one or more of such limbs, and an automatic intermittent flushing device to cause a flow of cleansing liquid downward through one or more of such units in the direction of the flow of gas.

9. In a gas cleaner, a washer unit comprising an upright cylinder, a pedestal in the cylinder upon the bottom, a rod extending upwardly from the pedestal, a stack of disks upon the rod, collars upon the rod between the disks, said disks being mutilated to allow the passage of gas, means for bringing the gas into the top of the cylinder, an automatic intermittent flushing device for injecting washing liquid into the top of the cylinder so that the gas and liquid will pass downwardly, and an outlet at the bottom of the cylinder.

10. In a gas cleaner, a cylinder, means for causing gas to flow therethrough, and superposed star-shaped sheets in the cylinder to present to such gas a plurality of sharp edges over and around which the gas may flow for the purpose of depositing by products along such edges, and means for removing the by products from such edges.

11. In a gas cleaner, a cylinder and a plurality of superposed stars therein spaced apart to form contractions, and expansions of the gas way.

12. In a gas cleaner, a cylinder, a plurality of superposed stars staggered relative to each other and spaced apart to form contractions, and expansions of the gas way, and means to cause a flow of cleansing medium through said cylinder.

13. In a gas cleaner, a cylinder, a plurality of superposed stars staggered relative to each other and spaced apart to form contractions and expansions of the gas way, and means to cause a flow of cleansing medium through said cylinder, in the direction of the flow of the gas.

14. In a gas cleaner, a cylinder, a plurality of superposed stars staggered relative to each other and spaced apart to form contractions and expansions of the gas way, and intermittent means to cause a flow of cleansing medium through said cylinder.

15. A gas cleaner provided with automatic intermittent means for removing by-products.

16. A gas cleaner provided with automatic means for intermittently removing the by-products along the direction in which the gas flows in said cleaner.

17. A gas cleaner provided with automatic means for intermittently removing the by-products.

18. A gas cleaner provided with automatic means for intermittently flushing the same.

19. A gas cleaner provided with automatic means for intermittently flushing the same by a cleansing medium directed to flow in the same direction as the gas.

20. In a gas cleaner, a cylinder, a plurality of superposed stars staggered relative to each other and spaced apart to form contractions and expansions of the gas-way, means for causing the gas to flow downwardly through the cylinder, and an automatic intermittent flushing device for causing a flow of cleansing medium downwardly through the cylinder.

21. In a gas cleaner, a cylinder having alternate expansions and contractions, and an automatic flush tank discharging into the cylinder.

22. A gas cleaner comprising means for conducting the gas downwardly along and successively accelerating and retarding it in a course, and an automatic flush-tank discharging into the cleaner.

23. A gas cleaner comprising a washer composed of units provided with means for removing byproducts from the gas, and an automatic flush-tank discharging into the units.

In testimony whereof, I have hereunto set my hand at Los Angeles California this 30th day of July 1907.

EDWARD H. AMET.

In presence of—
 JAMES R. TOWNSEND,
 M. BEULAH TOWNSEND.